United States Patent
Takahata et al.

(10) Patent No.: US 11,342,579 B2
(45) Date of Patent: May 24, 2022

(54) ALL-SOLID-STATE LITHIUM ION SECONDARY BATTERY HAVING MOISTURE-PROOF LAYER CONTAINING POLYMER COMPOUND AND METAL COMPOUND PARTICLES

(71) Applicant: TDK CORPORATION, Tokyo (JP)

(72) Inventors: Hiroaki Takahata, Tokyo (JP); Hisaji Oyake, Tokyo (JP); Masayuki Muroi, Tokyo (JP); Tetsuya Ueno, Tokyo (JP)

(73) Assignee: TDK CORPORATION, Tokyo (JP)

( * ) Notice: Subject to any disclaimer, the term of this patent is extended or adjusted under 35 U.S.C. 154(b) by 210 days.

(21) Appl. No.: 16/498,773

(22) PCT Filed: Mar. 28, 2018

(86) PCT No.: PCT/JP2018/012970
§ 371 (c)(1),
(2) Date: Sep. 27, 2019

(87) PCT Pub. No.: WO2018/181575
PCT Pub. Date: Oct. 4, 2018

(65) Prior Publication Data
US 2020/0274194 A1    Aug. 27, 2020

(30) Foreign Application Priority Data
Mar. 30, 2017    (JP) .............................. JP2017-067402

(51) Int. Cl.
*H01M 10/0562* (2010.01)
*H01M 4/131* (2010.01)
(Continued)

(52) U.S. Cl.
CPC ....... *H01M 10/0562* (2013.01); *H01M 4/131* (2013.01); *H01M 4/366* (2013.01);
(Continued)

(58) Field of Classification Search
CPC ............ H01M 10/562; H01M 10/525; H01M 10/0565; H01M 50/543; H01M 4/131; H01M 4/366
(Continued)

(56) References Cited

U.S. PATENT DOCUMENTS

2017/0373300 A1    12/2017    Maeda et al.

FOREIGN PATENT DOCUMENTS

| JP | 2000-311710 A | 11/2000 |
| JP | 2000311710 A * | 11/2000 |

(Continued)

OTHER PUBLICATIONS

Oct. 1, 2019 International Preliminary Report on Patentability issued in International Patent Application No. PCT/JP2018/012970.

*Primary Examiner* — Sean P Cullen
(74) *Attorney, Agent, or Firm* — Oliff PLC

(57) ABSTRACT

The present invention aims to provide an all-solid-state lithium ion secondary battery having a high reliability which does not have a decrease in battery capacity due to absorption of moisture in the air. The all-solid-state lithium ion secondary battery is provided with a battery body having an electrolyte layer between a positive electrode layer and a negative electrode layer, a pair of terminal electrodes respectively connected to the positive electrode layer and the negative electrode layer at both end portions of the battery body, and a moisture-proof layer disposed on surfaces excluding the surfaces to be the terminal electrodes, wherein the moisture-proof layer contains a cured product of a composition containing a polymer compound and metal compound particles.

13 Claims, 1 Drawing Sheet

(51) Int. Cl.
    *H01M 4/36*         (2006.01)
    *H01M 10/0525*    (2010.01)
    *H01M 10/0565*    (2010.01)
    *H01M 50/543*     (2021.01)
    *H01M 4/02*         (2006.01)

(52) U.S. Cl.
    CPC ... *H01M 10/0525* (2013.01); *H01M 10/0565* (2013.01); *H01M 50/543* (2021.01); *H01M 2004/021* (2013.01); *H01M 2004/027* (2013.01); *H01M 2004/028* (2013.01)

(58) Field of Classification Search
    USPC .................................................. 429/124, 163
    See application file for complete search history.

(56) References Cited

FOREIGN PATENT DOCUMENTS

| | | | |
|---|---|---|---|
| JP | 2006-351326 A | | 12/2006 |
| JP | 2006351326 A | * | 12/2006 |
| JP | 2008-186763 A | | 8/2008 |
| JP | 2008-226728 A | | 9/2008 |
| JP | 5165843 B2 | | 3/2013 |
| JP | 2015-111532 A | | 6/2015 |
| JP | 2015111532 A | * | 6/2015 |
| JP | 2015-220107 A | | 12/2015 |
| JP | 2015220106 A | * | 12/2015 |
| JP | 2015220107 A | * | 12/2015 |
| JP | WO2016/152565 A1 | | 2/2018 |

\* cited by examiner

ALL-SOLID-STATE LITHIUM ION SECONDARY BATTERY HAVING MOISTURE-PROOF LAYER CONTAINING POLYMER COMPOUND AND METAL COMPOUND PARTICLES

BACKGROUND

In recent years, all-solid-state lithium ion secondary batteries in which electrolytes are composed of ceramics are inherently non-flammable, and thus have attracted great attention.

Batteries using fire-resistant polymer electrolytes or batteries using ionic liquids as electrolytes are being studied up to now; however, since all the above batteries contain liquid organic substances, worries about liquid leakage and liquid depletion cannot be completely eliminated.

On the other hand, since all-solid-state lithium ion secondary batteries in which electrolytes are composed of ceramics are inherently non-flammable, high safety can be ensured.

Active materials in such all-solid-state lithium ion secondary batteries, for example, $LiCoO_2$, $LiMn_2O_4$, $LiFePO_4$, $LiNiO_2$ or the like, are prone to react with moisture and result in deterioration due to the reaction with moisture in the air, which causes a short circuit or in danger of not functioning as batteries.

Patent Document 1 discloses a thin-film solid secondary battery which prevents moisture intrusion by coating the surface of the thin-film solid secondary battery with a moisture-proof layer such as silicon oxide ($SiO_2$) or silicon nitride ($SiN_x$). However, the film strength of the silicon oxide film or the silicon nitride film is low, so cracks are likely to occur if it is subjected to an impact, and thus the battery capacity decreases due to moisture intruding from the cracks.

Patent Document 2 discloses an all-solid-state lithium ion secondary battery which is coated with a resin or a low-melting glass to prevent the all-solid-state lithium ion secondary battery from the contact with moisture. However, when resin is used for coating the all-solid-state lithium ion secondary battery, there is a problem that the resin absorbs moisture and the moisture-proof layer is thus deteriorated and broken, and the battery capacity decreases due to moisture intruding from the broken portion. In addition, when the all-solid-state lithium ion secondary battery is coated with the low-melting glass, since the film strength is low, if the low-melting glass is subjected to an impact, cracks are likely to occur, and thus the battery capacity decreases due to moisture intruding from the cracks.

PATENT DOCUMENTS

Patent document 1: JP2008-226728A
Patent document 2: JP5165843B

SUMMARY

The present invention has been made in view of the above-described problems in the prior art, and an objective of the present invention is to provide an all-solid-state lithium ion secondary battery which can prevent a decrease in battery capacity due to intrusion of moisture by increasing strength of a moisture-proof layer and preventing cracks from occurring in the moisture-proof layer.

In order to solve the above-described problems, an all-solid-state lithium ion secondary battery according to the present invention is characterized in that the all-solid-state lithium ion secondary battery is provided with a battery body having an electrolyte layer between a positive electrode layer and a negative electrode layer, a pair of terminal electrodes respectively connected to the positive electrode layer and the negative electrode layer at both end portions of the battery body, and a moisture-proof layer disposed on surfaces excluding the surfaces to be the terminal electrodes, wherein the moisture-proof layer contains a cured product of a composition containing a polymer compound and metal compound particles.

According to the all-solid-state lithium ion secondary battery, the moisture-proof layer of the all-solid-state lithium ion secondary battery provided on the surface excluding the surface to be the terminal electrodes is formed by using the cured product of the composition containing the polymer compound and the metal compound particles, and thus its mechanical strength is high, and the occurrence of cracks in the moisture-proof layer caused by the external impact or the deterioration of the film due to moisture absorption can be prevented. Therefore, the decrease in the battery capacity of the all-solid-state lithium ion secondary battery due to moisture intrusion can be prevented.

The all-solid-state lithium ion secondary battery of the present invention is characterized in that the polymer compound includes any one or more of polyethylene, polyester and polymethyl methacrylate.

According to the all-solid-state lithium ion secondary battery, the polymer compound include any one or more of polyethylene, polyester and polymethyl methacrylate, and thus the mechanical strength is high, and the occurrence of cracks in the moisture-proof layer caused by the external impact or the deterioration of the film due to moisture absorption can be prevented. Therefore, the decrease in the battery capacity of the all-solid-state lithium ion secondary battery due to the moisture intrusion can be prevented.

Further, the all-solid-state lithium ion secondary battery of the present invention is characterized in that the polymer compound contains polyethylene.

According to the all-solid-state lithium ion secondary battery, since the polymer compound contains polyethylene, the mechanical strength becomes high, and the occurrence of cracks in the moisture-proof layer caused by the external impact or the deterioration of the film due to moisture absorption can be prevented. Thus, the decrease in the battery capacity of the all-solid-state lithium ion secondary battery due to the moisture intrusion can be prevented.

The all-solid-state lithium ion secondary battery of the present invention is characterized in that the metal compound particles contained in the moisture-proof layer include any one or more of metal oxide particles and metal nitride particles.

According to the all-solid-state lithium ion secondary battery, the metal compound particles are set to be any one or more of metal oxide particles and metal nitride particles, thereby improving adhesion between the all-solid-state lithium ion secondary battery body and the moisture-proof layer and preventing the occurrence of cracks in the moisture-proof layer. Therefore, the decrease in the battery capacity of the all-solid-state lithium ion secondary battery due to the moisture intrusion can be prevented.

The all-solid-state lithium ion secondary battery of the present invention is characterized in that the metal compound particles contained in the moisture-proof layer are metal oxide particles.

According to the all-solid-state lithium ion secondary battery, the metal compound particles are set to be metal oxide particles, thereby improving the adhesion between the all-solid-state lithium ion secondary battery body and the moisture-proof layer and preventing the occurrence of cracks in the moisture-proof layer. Therefore, the decrease in the battery capacity of the all-solid-state lithium ion secondary battery due to the moisture intrusion can be prevented.

The all-solid-state lithium ion secondary battery of the present invention is characterized in that the metal oxide particles contained in the moisture-proof layer include any one or more of Bi oxide particles, Al oxide particles and Si oxide particles.

According to the all-solid-state lithium ion secondary battery, the metal oxide particles include any one or more of the Bi oxide particles, the Al oxide particles, and Si oxide particles, thereby improving the adhesion between the all-solid-state lithium ion secondary battery body and the moisture-proof layer and preventing the occurrence of cracks in the moisture-proof layer. Therefore, the decrease in the battery capacity of the all-solid-state lithium ion secondary battery due to the moisture intrusion can be prevented.

Further, the all-solid-state lithium ion secondary battery of the present invention is characterized in that the metal oxide particles contained in the moisture-proof layer include Bi oxide particles.

According to the all-solid-state lithium ion secondary battery, the metal oxide particles contain Bi oxide particles, thereby improving the adhesion between the all-solid-state lithium ion secondary battery body and the moisture-proof layer and preventing the occurrence of cracks in the moisture-proof layer. Therefore, the decrease in the battery capacity of the all-solid-state lithium ion secondary battery due to the moisture intrusion can be prevented.

In the all-solid-state lithium ion secondary battery of the present invention, the weight ratio of the metal compound particles contained in the moisture-proof layer is preferably 5%-50%.

According to the all-solid-state lithium ion secondary battery, the weight ratio of the metal compound particles contained in the moisture-proof layer are set to be 5%-50%, thereby improving the mechanical strength of the moisture-proof layer and preventing the occurrence of cracks in the moisture-proof layer. Therefore, the decrease in the battery capacity of the all-solid-state lithium ion secondary battery due to the moisture intrusion can be prevented.

The all-solid-state lithium ion secondary battery of the present invention is characterized in that the positive electrode layer, the negative electrode layer and the electrolyte layer disposed between the positive electrode layer and the negative electrode layer have a relative density of 80% or above.

According to the present invention, an all-solid-state lithium ion secondary battery having a high reliability, in which cracks in the moisture-proof layer and intrusion of moisture from the outside can be suppressed, and the decrease in the battery capacity of the battery due to the moisture intrusion can be prevented, can be provided.

DETAILED DESCRIPTION OF EMBODIMENTS

Hereinafter, preferred embodiments of the present invention will be described with reference to the accompanying drawings. In addition, the present invention is not limited to the following embodiments. Further, the constituent elements described below may be combined as appropriate.

(All-Solid-State Lithium Ion Secondary Battery)

Figure 1:
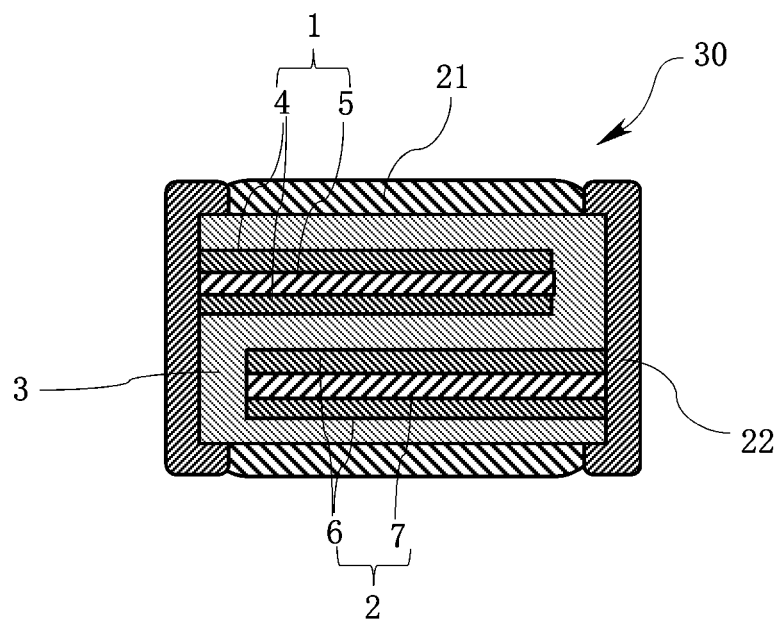
FIG. 1 is a schematic cross-sectional view of an all-solid-state lithium ion secondary battery.
Figure 2:
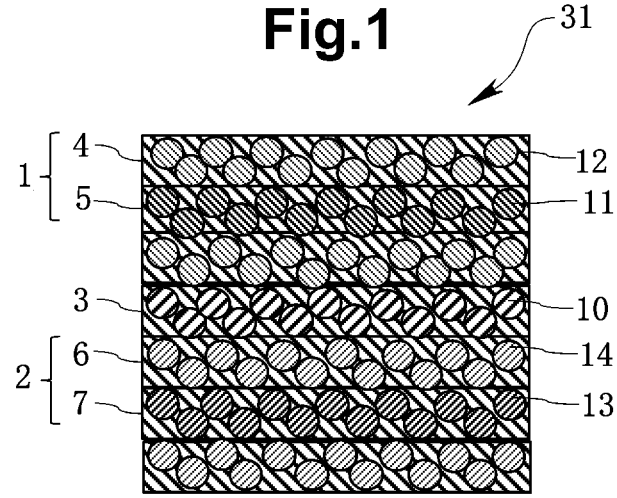
FIG. 2 is a schematic view of battery elements inside the all-solid-state lithium ion secondary battery.

FIG. 1 is a cross-sectional view showing a conceptual structure of an all-solid-state lithium ion secondary battery 30 according to an example of the present embodiment. In addition, FIG. 2 is a view schematically showing an internal structure of the all-solid-state lithium ion secondary battery 30. The all-solid-state lithium ion secondary battery 30 shown in FIG. 1 is provided with a positive electrode layer 1 as a first electrode layer and a negative electrode layer 2 as a second electrode layer. A solid electrolyte layer 3 is disposed between the positive electrode layer 1 and the negative electrode layer 2, the positive electrode layer 1 is composed of a positive electrode current collector layer 5 and a positive electrode active material layer 4, and the negative electrode layer 2 is composed of a negative electrode current collector layer 7 and a negative electrode active material layer 6. Two ends of a battery body composed of the positive electrode layer 1, the negative electrode layer 2 and the solid electrolyte layer 3 are covered with a terminal electrode 22 respectively. The positive electrode current collector layer 5 and the negative electrode current collector layer 7 are electrically connected to the terminal electrodes 22, respectively. A portion, not covered by the terminal electrodes 22, of the battery body composed of the positive electrode layer 1, the negative electrode layer 2 and the solid electrolyte layer 3 is covered with a moisture-proof layer 21.

(Solid Electrolyte)

The solid electrolyte layer 3 of the all-solid-state lithium ion secondary battery 30 of the present embodiment contains a solid electrolyte 10. In addition to the solid electrolyte 10, the solid electrolyte layer 3 may further contain a sintering aid or the like. Further, a material having low electron conductivity and high lithium ion conductivity is preferably adopted as the solid electrolyte 10. For example, at least one selected from the group consisting of $Li_{3+x1}Si_{x1}P_{1-x1}O_4$ ($0.4 \leq x1 \leq 0.6$), $Li_{1+x2}Al_{x2}Ti_{2-x2}(PO_4)_3$ ($0 \leq x2 \leq 0.6$), lithium germanium phosphate ($LiGe_2(PO_4)_3$), $Li_2O-V_2O_5-SiO_2$, $Li_2O-P_2O_5-B_2O_3$ and $Li_3PO_4$ is preferable.

(Positive Electrode Active Material and Negative Electrode Active Material)

As a positive electrode active material 12 and a negative electrode active material 14 constituting the positive electrode active material layer 4 and the negative electrode active material layer 6 of the all-solid-state lithium ion secondary battery 30 of the present embodiment, it is preferable to use a material capable of efficiently inserting and desorbing lithium ions. For example, a transition metal oxide or a transition metal composite oxide is preferably used. Specifically, any one of lithium manganese composite oxide $Li_2Mn_{x3}Ma_{1-x3}O_3$ ($0.8 \leq x3 \leq 1$, Ma is Co or Ni), lithium cobaltate ($LiCoO_2$), lithium nickelate ($LiNiO_2$), lithium manganese spinel ($LiMn_2O_4$), a composite metal oxide represent by a general formula of $LiNi_{x4}Co_{y4}Mn_{z4}O_2$ ($x4+y4+z4=1$, $0 \leq x4 \leq 1$, $0 \leq y4 \leq 1$, $0 \leq z4 \leq 1$), a lithium vanadium compound ($LiV_2O_5$), olivine-type $LiMbPO_4$ (wherein Mb is one or more elements selected from Co, Ni, Mn, Fe, Mg, Nb, Ti, Al, and Zr), lithium vanadium phosphate ($Li_3V_2(PO_4)_3$ or $LiVOPO_4$), Li-excessive solid solution positive electrode $Li_2MnO_3$-$LiMcO_2$ (Mc is Mn, Co, or Ni), lithium titanate ($Li_4Ti_5O_{12}$), and a composite metal oxide represent by a general formula of $Li_aNi_{x5}Co_{y5}Al_{z5}O_2$ ($0.9<a<1.3$, $0.9<x5+y5+z5<1.1$) is preferable.

In particular, in the case that $Li_{1+x2}Al_{x2}Ti_{2-x2}(PO_4)_3$ ($0 \leq x2 \leq 0.6$) is used for the solid electrolyte layer 3 and one or both of $LiVOPO_4$ and $Li_3V_2(PO_4)_3$ is used for one or both of the positive electrode active material layer 4 and the negative electrode active material layer 6, the bonding between the solid electrolyte layer 3 and the one or both of the positive electrode active material layer 4 and the negative electrode active material layer 6 becomes firm and the contact area also can be enlarged. Thus, it is preferable.

In addition, the active materials constituting the positive electrode active material layer 4 or the negative electrode active material layer 6 are not clearly distinguished. After comparing the potentials of two kinds of the compounds, the compound exhibiting a higher potential can be used as the positive electrode active material 12, and the compound exhibiting a lower potential can be used as the negative electrode active material 14.

(Positive Electrode Current Collector and Negative Electrode Current Collector)

As a positive electrode current collector 11 and a negative electrode current collector 13 constituting the positive electrode current collector layer 5 and the negative electrode current collector layer 7 of the all-solid-state lithium ion secondary battery 30 of the present embodiment, a material having a high electric conductivity is preferably used; for example, silver, palladium, gold, platinum, aluminum, copper, nickel or the like is preferable. In particular, copper is less likely to react with the positive electrode active material 12, the negative electrode active material 14 and the solid electrolyte 10, and is also effective in reducing the internal resistance of the all-solid-state lithium ion secondary battery 30; therefore, copper is preferable. Further, the positive electrode current collector 11 and the negative electrode current collector 13 constituting the positive electrode current collector layer 5 and the negative electrode current collector layer 7 may be the same or different.

Moreover, it is preferable that the positive electrode current collector layer 5 and the negative electrode current collector layer 7 contain the positive electrode active material 12 and the negative electrode active material 14, respectively. The content ratio in this case is not particularly limited as long as they can function as current collectors. However, it is preferable that the volume ratio of the positive electrode current collector 11 to the positive electrode active material 12 or the volume ratio of the negative electrode current collector 13 to the negative electrode active material 14 is within a range of 90/10 to 70/30.

In the situation that the positive electrode current collector layer 5 and the negative electrode current collector layer 7 contain the positive electrode active material 12 and the negative electrode active material 14 respectively, the adhesion between the positive electrode current collector layer 5 and the positive electrode active material layer 4 and the adhesion between the negative electrode current collector layer 7 and the negative electrode active material layer 6 are improved, and thus the situation is preferable.

(Moisture-Proof Layer)

The moisture-proof layer 21 of the all-solid-state lithium ion secondary battery 30 of the present embodiment is formed on the surface of the battery body. As a polymer compound constituting the moisture-proof layer 21, for example, polyolefins (such as polyethylene, polyethylene terephthalate, and polypropylene), phenol resin, urethane resin, epoxy resin, polycarbonate, polystyrene, vinyl chloride resin, polyvinylidene chloride, alkyd resin, melamine resin, polyimide, polyester, polymethyl methacrylate, and the like can be used. From the viewpoint of moisture resistance, polyethylene, polyester or polymethyl methacrylate is preferable, and polyethylene is more preferable. Further, as a metal compound, for example, a metal oxide or a metal nitride of at least one element selected from the group consisting of Al, Ta, Zr, Si, Ti, Mn, Zn, Sr, Bi, Ca, Ga, In, Fe, Co, Cu, Ni, Nb, Ba, Ge, and Sn can be used. It is preferable to select a metal oxide having a low reactivity with water molecules in the air. Further, from the viewpoint of a high bonding force with the polymer compound and improvement of mechanical strength of the moisture-proof layer 21, it is preferable to select an oxide of Al, Si or Bi, and it is more preferable to select an oxide of Bi.

The weight ratio of the metal compound particles contained in the moisture-proof layer 21 is preferably 5%-50%. If the weight ratio of the metal compound particles contained in the moisture-proof layer 21 is less than 5% or more than 50%, the sufficient bonding force between the polymer compound and the metal compound particles cannot be obtained, and the mechanical strength of the moisture-proof layer 21 is lowered.

(Terminal Electrode)

The terminal electrodes 22 of the all-solid-state lithium ion secondary battery 30 of the present embodiment are preferably made of a material having a large electric conductivity, and for example, silver, gold, platinum, aluminum, copper, tin, or nickel is preferably used. The terminal electrodes 22 may be made of one material, or may also be made of various materials in combination. Further, it may be composed of a single layer or multiple layers.

(Production Method of all-Solid-State Lithium Ion Secondary Battery)

The all-solid-state lithium ion secondary battery 30 of the present embodiment can be produced by making each material of the positive electrode current collector layer 5, the positive electrode active material layer 4, the solid electrolyte layer 3, the negative electrode active material layer 6, and the negative electrode current collector layer 7 into paste; coating and drying to form green sheets; laminating the green sheets to prepare a laminated body; firing the obtained laminated body to produce a battery body; and then applying the moisture-proof layer 21 to the battery body.

The method for making paste is not particularly limited. For example, a powder of each of the above materials may be mixed into a vehicle to obtain a paste. Here, the vehicle is a generic term for medium in a liquid phase. The vehicle contains a solvent and a binder. A paste for the positive electrode current collector layer 5, a paste for the positive electrode active material layer 4, a paste for the solid electrolyte layer 3, a paste for the negative electrode active material layer 6, and a negative electrode current collector layer 7 can be produced by the above-mentioned method.

The composition of the pastes is not particularly limited. The paste for the positive electrode active material layer 4 and the paste for the negative electrode active material layer 6 may contain a solid electrolyte or a sintering aid or a conductive material in addition to the active material, and the paste for the positive electrode current collector layer 5 and the paste for the negative electrode current collector layer 7 may also contain an active material, a solid electrolyte, or a sintering aid.

The prepared pastes are coated on a substrate such as PET (polyethylene terephthalate) in a predetermined order, and dried if necessary, and then the substrate is peeled off to prepare a green sheet. The method for coating the paste is not particularly limited, and a known method such as screen printing, coating, transfer printing, or doctor blade method can be employed.

The produced green sheets for the positive electrode current collector layer 5, the positive electrode active material layer 4, the solid electrolyte layer 3, the negative electrode active material layer 6, and the negative electrode current collector layer 7 are laminated in a predetermined order and in a predetermined layer number, and then alignment, cutting and the like are performed as needed to prepare a laminated body. In the case of producing a parallel type or series-parallel type battery, it is preferable to perform alignment and then laminate so that the end face of the positive electrode layer 1 and the end face of the negative electrode layer 2 are not aligned.

During producing a laminated body, a positive electrode active material layer unit and a negative electrode active material layer unit described below may be prepared to produce the laminated body.

In the production method, first, the paste for the solid electrolyte layer 3 is formed into a sheet by a doctor blade method on a PET film to obtain the sheet for the solid electrolyte layer 3, after that, the paste for the positive electrode active material layer 4 is printed on the sheet for the solid electrolyte layer 3 by screen printing and then dried. Next, the paste for the positive electrode current collector layer 5 is printed thereon by screen printing and then dried. Further, the paste for the positive electrode active material layer 4 is printed thereon again by screen printing, and dried, and then the PET film is peeled off to obtain the positive electrode active material layer unit. In this way, the positive electrode active material layer unit in which the paste for the positive electrode active material layer 4, the paste for the positive electrode current collector layer 5, and the paste for the positive electrode active material layer 4 are successively formed on the sheet for the solid electrolyte layer 3 is obtained. The negative electrode active material layer unit is produced in the same manner, and the negative electrode active material layer unit in which the paste for the negative electrode active material layer 6, the paste for the negative electrode current collector layer 7, and the paste for the negative electrode active material layer 6 are successively formed on the sheet for the solid electrolyte layer 3 is thus obtained.

A positive electrode active material layer unit and a negative electrode active material layer unit are laminated in a way that the paste for the positive electrode active material layer 4, the paste for the positive electrode current collector layer 5, the paste for the positive electrode active material layer 4, the sheet for the solid electrolyte layer 3, the paste for the negative electrode active material layer 6, the paste for the negative electrode current collector layer 7, the paste for the negative electrode active material layer 6, and the sheet for the solid electrolyte layer 3 are formed in sequence. At that time, the units are laminated in a staggered manner by the way of making the paste for the positive electrode current collector layer 5 of the first positive electrode active material layer unit extend only to one end face and making the paste for the negative electrode current collector layer 7 of the second negative electrode active material layer unit extend only to the other face. The sheets for the solid electrolyte layer 3 having a predetermined thickness are further laminated on both faces of the laminated unit to form a laminated body.

The resulting laminated bodies are bonded together under pressure. The bonding is carried out under pressure while heating and the heating temperature is set to be, for example, 40° C. to 95° C.

The bonded laminated body is heated to 600° C. to 1000° C. in, for example, a nitrogen atmosphere, and fired to produce a battery body. The firing time is set to be, for example, 0.1 to 3 hours.

The battery body may be put into a cylindrical container together with an abradant such as alumina to perform barrel polishing. Thereby, chamfering of the corners of a battery body can be performed. As another method, polishing may also be performed by sandblasting. In this method, since only a specific corner portion can be cut, the method is thus preferable.

(Moisture-Proof Layer)

The moisture-proof layer 21 can be produced, for example, in the following manner. A dispersion liquid containing the polymer compound and metal compound particles as constituent components of the moisture-proof layer 21 is added dropwise onto the battery body to form a specified thickness by using, for example, a spin coater and then is dried. Thus, the all-solid-state lithium ion secondary battery having a moisture-proof layer formed on the surface of the battery body can be manufactured. The moisture-proof layer 21 may be formed on at least a part of the surface of the battery body, or may be formed on the entire surface of the battery body. In addition, the moisture-proof layer 21 is not required on the surface on which the terminal electrodes are formed. Further, since the all-solid-state lithium ion secondary battery greatly expands and contracts in the lamination direction, the moisture-proof layer is preferably formed on the outermost surface of the battery body. As a method of forming the moisture-proof layer 21 at a specific portion, for example, a masking method, a method of polishing the end portion after the moisture-proof layer 21 is formed, or the like may be mentioned.

(Formation of Terminal Electrodes)

The terminal electrodes 22 are mounted on the battery body. The terminal electrodes 22 are mounted in electric contact with the positive electrode current collector layer 5 and the negative electrode current collector layer 7, respectively. There is no limitation on this, and they are preferably formed by, for example, sputtering or dipping. Further, it is preferable that the terminal electrodes cover all the faces not covered by the moisture-proof layer 21.

The positive electrode layer, the negative electrode layer and the electrolyte layer disposed between the positive electrode layer and the negative electrode layer of the battery body have a relative density of 80% or above. When the relative density is high, the diffusion path of the movable ions in the crystal will be easily connected, and the ion conductivity can be improved.

EXAMPLES

Example 1

Hereinafter, the present invention will be described in detail based on Examples and Comparative Examples, but the present invention is not limited to the following examples. Further, the term "parts" refer to "parts by weight" unless otherwise specified.

(Production of Positive Electrode Active Material and Negative Electrode Active Material)

As the positive electrode active material and the negative electrode active material, $Li_3V_2(PO_4)_3$ produced by the following method was used. $Li_2CO_3$, $V_2O_5$ and $NH_4H_2PO_4$, were used as starting materials, wet-mixed for 16 hours by using a ball mill, and then dehydrated and dried to obtain powder; after that, the obtained powder was calcined at 850°

C. for 2 hours in a mixed gas of nitrogen and hydrogen. The calcined product was wet-pulverized by using a ball mill, and then dehydrated and dried to obtain positive electrode active material powder and negative electrode active material powder. It was confirmed by using an X-ray diffractometer that the composition of the produced powder was $Li_3V_2(PO_4)_3$.

(Production of Paste for Positive Electrode Active Material Layer and Paste for Negative Electrode Active Material Layer)

The paste for the positive electrode active material layer and the paste for the negative electrode active material layer were prepared by adding 15 parts of ethyl cellulose as a binder and 65 parts of dihydroterpineol as a solvent to 100 parts of the positive electrode active material powder and the negative electrode active material powder, and then mixing and dispersing.

(Production of Paste for Solid Electrolyte Layer) As the solid electrolyte, $Li_{1.3}Al_{0.3}Ti_{1.7}(PO_4)_3$ produced by the following method was used. $Li_2CO_3$, $Al_2O_3$, $TiO_2$ and $NH_4H_2PO_4$ were used as starting materials, wet-mixed for 16 hours by using a ball mill, and then dehydrated and dried to obtain powder. The obtained powder was calcined in air at 800° C. for 2 hours. The calcined product was wet-pulverized using a ball mill for 24 hours, and then dehydrated and dried to obtain powder of the solid electrolyte. It was confirmed by using an X-ray diffractometer that the composition of the produced powder was $Li_{1.3}Al_{0.3}Ti_{1.7}(PO_4)_3$.

Next, 100 parts of ethanol and 200 parts of toluene were added as a solvent to the powder, and then wet mixing was carried out using a ball mill. Thereafter, 16 parts of polyvinyl butyral binder and 4.8 parts of benzyl butyl phthalate were further added and mixed to prepare the paste for the solid electrolyte layer.

(Production of Sheet for Solid Electrolyte Layer)

A PET film was used as a substrate, and then the paste for the solid electrolyte layer was molded into a sheet by doctor blade method to obtain a sheet for the solid electrolyte layer having a thickness of 15

(Production of Paste for Positive Electrode Current Collector Layer and Paste for Negative Electrode Current Collector Layer)

Cu and the positive electrode active material and negative electrode active material $Li_3V_2(PO_4)_3$ used as the positive electrode current collector and the negative electrode current collector were mixed with a volume ratio of 80 parts/20 parts, and then 10 parts of ethyl cellulose as a binder and 50 parts of dihydroterpineol as a solvent were added, and then mixed and dispersed to prepare the paste for the positive electrode current collector layer and the paste for the negative electrode current collector layer. The average particle size of Cu was 0.9

(Production of Paste for Terminal Electrodes)

Silver powder, epoxy resin, and a solvent were mixed and dispersed by a three-roll mill to prepare a thermosetting conductive paste.

An all-solid-state lithium ion secondary battery was produced by using these pastes as follows.

(Production of Positive Electrode Active Material Unit)

The paste for the positive electrode active material layer was printed on the sheet for the solid electrolyte layer described above by screen printing with a thickness of 5 and then dried at 80° C. for 10 minutes. Next, the paste for the positive electrode current collector layer was printed thereon by screen printing with a thickness of 5 and dried at 80° C. for 10 minutes. Further, the paste for the positive electrode active material layer was printed thereon again by screen printing with a thickness of 5 and dried at 80° C. for 10 minutes, and then the PET film was peeled off. In this manner, the paste for the positive electrode active material layer, the paste for the positive electrode current collector layer, and the paste for the positive electrode active material layer were successively printed on the sheet for the solid electrolyte layer, and then dried to obtain a sheet of the positive electrode active material unit.

(Production of Negative Electrode Active Material Unit)

The paste for the negative electrode active material layer was printed on the sheet for the solid electrolyte layer described above by screen printing with a thickness of 5 µm, and then dried at 80° C. for 10 minutes. Next, the paste for the negative electrode current collector layer was printed thereon by screen printing with a thickness of 5 µm, and then dried at 80° C. for 10 minutes. Further, the paste for the negative electrode active material layer was printed thereon again by screen printing with a thickness of 5 µm, and dried at 80° C. for 10 minutes, and then the PET film was peeled off. In this manner, the paste for the negative electrode active material layer, the paste for the negative electrode current collector layer, and the paste for the negative electrode active material layer were successively printed on the sheet for the solid electrolyte layer, and then dried to obtain a sheet of the negative electrode active material unit.

(Production of Battery Body)

Ten sheets for the solid electrolyte layer were laminated, and 25 sheets of the positive electrode active material unit and 25 sheets of the negative electrode active material unit were laminated in a way that the paste for the positive electrode active material layer, the paste for the positive electrode current collector layer, the paste for the positive electrode active material layer, the sheet for the solid electrolyte layer, the paste for the negative electrode active material layer, the paste for the negative electrode current collector layer, the paste for the negative electrode active material layer, and the sheet for the solid electrolyte layer were formed in sequence. At that time, the units were laminated in a staggered manner by the way of making the pastes for the positive electrode current collector layer in the odd-numbered sheets of the positive electrode active material unit extend only to one end face, and making the pastes for the negative electrode current collector layer in the even-numbered sheets of the negative electrode active material unit extend only to the opposite face. Ten sheets for the solid electrolyte layer were laminated on the laminated unit. Then, molding was carried out by uniaxial pressing at 80° C. under a pressure of 1000 kgf/cm² [98 MPa]. Subsequently, cutting was carried out to prepare a laminated body, and then the laminated body was fired to obtain a battery body. Firing was performed by raising the temperature to a firing temperature of 840° C. at a heating rate of 200° C./hr in nitrogen, and then keeping this temperature for 2 hours. After firing, the laminated body was naturally cooled. After firing, the size of the surface perpendicular to the lamination direction was 3.2 µm×2.5 µm.

(Production of Moisture-Proof Layer)

17 parts by weight of polyethylene (Fluothane MG401N, produced by Sumitomo Seika Chemicals Co., Ltd.) and 83 parts by weight of acetone were mixed, and then 60 parts by weight of the 5% $Bi_2O_3$ solution (Bi-05, produced by High Purity Chemical Laboratory Co., Ltd.) was added while stirring. The mixture was stirred at room temperature for 1 hour to obtain a moisture-proof layer material dispersion solution. After the end portions were covered with mask so that the end portions of the positive electrode current collector layer and the negative electrode current collector layer were not covered by the moisture-proof layer, the dispersion solution was coated on the battery body with a thickness of 10 µm by using a spin coater (100 rpm). Then, the moisture-proof layer was formed on the battery body after heat treatment at 200° C. for 5 minutes and then cooling at room temperature for 1 hour.

(Forming Process of Terminal Electrodes)

After removing the mask formed on the end surfaces of the battery body, the terminal electrode paste was coated onto the end faces of the laminated body and the moisture-proof layer, and then thermally cured at 150° C. for 30 minutes to form a pair of terminal electrodes 22, thereby obtaining an all-solid-state lithium ion secondary battery.

Example 2

The all-solid-state lithium ion secondary battery of Example 2 was produced in the same manner as in Example 1 except that 100 parts by weight of the 3% $Al_2O_3$ solution (Al-03-P, produced by High Purity Chemical Laboratory Co., Ltd.) was added as a metal compound component to replace the $Bi_2O_3$ solution.

Example 3

The all-solid-state lithium ion secondary battery of Example 3 was produced in the same manner as in Example 1 except that 60 parts by weight of the 5% $SiO_2$ solution (Si-05-S, produced by High Purity Chemical Laboratory Co., Ltd.) was added as a metal compound component to replace the $Bi_2O_3$ solution.

Example 4

The all-solid-state lithium ion secondary battery of Example 4 was produced in the same manner as in Example 1 except that the amount of polyethylene was set to be 19 parts by weight, the amount of acetone was set to be 81 parts by weight and the amount of the 5% $Bi_2O_3$ solution was set to be 20 parts by weight.

Example 5

The all-solid-state lithium ion secondary battery of Example 5 was produced in the same manner as in Example 1 except that the amount of polyethylene was set to be 15 parts by weight, the amount of acetone was set to be 85 parts by weight and the amount of the 5% $Bi_2O_3$ solution was set to be 100 parts by weight.

Example 6

The all-solid-state lithium ion secondary battery of Example 6 was produced in the same manner as in Example 1 except that the amount of polyethylene was set to be 14 parts by weight, the amount of acetone was set to be 86 parts by weight and the amount of the 5% $Bi_2O_3$ solution was set to be 120 parts by weight.

Example 7

The all-solid-state lithium ion secondary battery of Example 7 was produced in the same manner as in Example 1 except that the amount of polyethylene was set to be 19.4 parts by weight, the amount of acetone was set to be 80.6 parts by weight and the amount of the 5% $Bi_2O_3$ solution was set to be 12 parts by weight.

Example 8

The all-solid-state lithium ion secondary battery of Example 8 was produced in the same manner as in Example 1 except that the amount of polyethylene was set to be 13 parts by weight, the amount of acetone was set to be 87 parts by weight and the amount of the 5% $Bi_2O_3$ solution was set to be 140 parts by weight.

Example 9

56.6 parts by weight of the 30% polyester solution (PES-RESIN A125S, produced by Takamatsu Oil & Fat Co., Ltd.) and 43.4 parts by weight of acetone were mixed, and then 60 parts by weight of the $Bi_2O_3$ solution (Bi-05, produced by High Purity Chemical Laboratory Co., Ltd.) was added while stirring. The mixture was stirred at room temperature for 1 hour to obtain the dispersion solution of the moisture-proof layer material. After the end portions were covered with mask so that the end portions of the positive electrode current collector layer and the negative electrode current collector layer were not covered by the moisture-proof layer, the dispersion solution was coated on the battery body with a thickness of 10 µm by using a spin coater (100 rpm). Then, the moisture-proof layer was formed on the battery body after heat treatment at 120° C. for 3 minutes and then cooling at room temperature for 1 hour.

Example 10

42.5 parts by weight of the 40% polymethyl methacrylate solution (S-744, produced by DIC Co., Ltd.) and 57.5 parts by weight of acetone were mixed, and then 60 parts by weight of the $Bi_2O_3$ solution (Bi-05, produced by High Purity Chemical Laboratory Co., Ltd.) was added while stirring. The mixture was stirred at room temperature for 1 hour to obtain the dispersion solution of the moisture-proof layer material. After the end portions were covered with mask so that the end portions of the positive electrode current collector layer and the negative electrode current collector layer were not covered by the moisture-proof layer, the dispersion solution was coated on the battery body with a thickness of 10 µm by using a spin coater (100 rpm). Then, the moisture-proof layer was formed on the battery body after heat treatment at 120° C. for 3 minutes and then cooling at room temperature for 1 hour.

Example 11

8.5 parts by weight of polyethylene and 90 parts by weight of acetone were mixed, and then 1.5 parts by weight of aluminum nitride (High-Purity Aluminum Nitride Grade E, produced by Tokuyama Corporation) was added while stirring. The mixture was stirred at room temperature for 1 hour to obtain the dispersion solution of the moisture-proof layer material. After the end portions were covered with mask so that the end portions of the positive electrode current collector layer and the negative electrode current collector layer were not covered by the moisture-proof layer, the dispersion solution was coated on the battery body with a thickness of 10 μm by using a spin coater (100 rpm). Then, the moisture-proof layer was formed on the battery body after heat treatment at 200° C. for 5 minutes and then cooling at room temperature for 1 hour.

Comparative Example 1

The all-solid lithium ion secondary battery was produced in the same manner as in Example 1 except that the 5% $Bi_2O_3$ solution in Example 1 was not used.

Comparative Example 2

The all-solid lithium ion secondary battery was produced in the same manner as in Example 9 except that the 5% $Bi_2O_3$ solution in Example 9 was not used.

Comparative Example 3

The all-solid lithium ion secondary battery was produced in the same manner as in Example 10 except that the 5% $Bi_2O_3$ solution in Example 10 was not used.

(Moisture Resistance Test)

The all-solid-state lithium ion secondary batteries produced by the methods of Examples 1-11 and Comparative Examples 1-3 were prepared for a moisture resistance test. The produced all-solid-state lithium ion secondary batteries were placed in a charge-discharge tester, charged at a current of 100 ρA to a voltage of 1.8 V, and then discharged to 0 V at a current of 100 ρA, and the initial discharge capacity was then measured. The all-solid-state lithium ion secondary batteries charged to 1.8 V were discharged again to 50% of the initial discharge capacity, and then placed in a 60° C., 90% RH constant temperature and humidity cabinet for 12 hours, 24 hours, 48 hours, 96 hours, 240 hours, 500 hours, 1000 hours, 1500 hours, and 2000 hours, and then taken out. Then, the all-solid-state lithium ion secondary batteries were placed at room temperature for 8 hours or more, and then the discharge capacity after the moisture resistance test was measured in the same manner as for the initial discharge capacity. The discharge capacity of the all-solid-state lithium ion secondary batteries before the moisture resistance test was set to be 100%, and the all-solid-state lithium ion secondary batteries having a discharge capacity of 80% or above after the moisture resistance test were set as qualified.

(Test Result)

The results of the capacity retention time of the all-solid-state lithium ion secondary batteries of Examples 1-11 and Comparative Examples 1-3 after the moisture resistance test were shown in Table 1.

TABLE 1

|  | Polymer compound | Metal compound containing organic groups | | >80% capacity retention |
|---|---|---|---|---|
|  | Type | Type | Content | time @60° C. 90% RH |
| Example 1 | Polyethylene | $Bi_2O_3$ | 15 | >2000 |
| Example 2 | Polyethylene | $Al_2O_3$ | 15 | 1500 |
| Example 3 | Polyethylene | $SiO_2$ | 15 | 1500 |
| Example 4 | Polyethylene | $Bi_2O_3$ | 5 | >2000 |
| Example 5 | Polyethylene | $Bi_2O_3$ | 25 | >2000 |
| Example 6 | Polyethylene | $Bi_2O_3$ | 30 | >2000 |
| Example 7 | Polyethylene | $Bi_2O_3$ | 3 | 1500 |
| Example 8 | Polyethylene | $Bi_2O_3$ | 35 | 1500 |
| Example 9 | Polyester | $Bi_2O_3$ | 15 | 1500 |
| Example 10 | Polymethyl methacrylate | $Bi_2O_3$ | 15 | 1500 |
| Example 11 | Polyester | AlN | 15 | 1000 |
| Comparative Example 1 | Polyethylene | — | — | 240 |
| Comparative Example 2 | Polyester | — | — | 96 |
| Comparative Example 3 | Polymethyl methacrylate | — | — | 240 |

As shown in Table 1, it was considered that by forming the moisture-proof layer from the cured product of the composition containing the polymer compound and metal compound particles, the all-solid-state lithium ion secondary battery having little deterioration in battery capacity after the moisture resistance test as well as a high reliability could be obtained.

As described above, the all-solid-state lithium ion secondary battery of the present invention has less deterioration in battery capacity after the moisture resistance test. By providing a highly reliable battery in this way, it has made a great contribution especially in the field of electronics.

DESCRIPTION OF REFERENCE NUMERALS

1 Positive electrode layer
2 Negative electrode layer
3 Solid electrolyte layer
4 Positive electrode active material layer
5 Positive electrode current collector layer
6 Negative electrode active material layer
7 Negative electrode current collector layer
10 Solid electrolyte
11 Positive electrode current collector
12 Positive electrode active material
13 Negative electrode current collector
14 Negative electrode active material
21 Moisture-proof layer
22 Terminal electrode
30 All-solid-state lithium ion secondary battery
31 Electric storage element inside the all-solid-state lithium ion secondary battery

What is claimed is:

1. An all-solid-state lithium ion secondary battery, comprising a battery body having an electrolyte layer between a positive electrode layer and a negative electrode layer, a pair of terminal electrodes respectively connected to the positive electrode layer and the negative electrode layer at both end portions of the battery body, and a moisture-proof layer covering and contacting surfaces of the battery body except surfaces to be the terminal electrodes,
    wherein the moisture-proof layer contains a cured product of a composition including a polymer compound and metal compound particles, and
    wherein the weight ratio of the metal compound particles contained in the moisture-proof layer is 5%-35%.

2. The all-solid-state lithium ion secondary battery according to claim 1, wherein
    the moisture-proof layer covers and contacts the electrolyte layer.

3. The all-solid-state lithium ion secondary battery according to claim 1, wherein the moisture-proof layer is the outermost layer of the lithium ion secondary battery.

4. The all-solid-state lithium ion secondary battery according to claim 1, wherein
    the polymer compound includes any one or more of polyethylene, polyester and polymethyl methacrylate.

5. The all-solid-state lithium ion secondary battery according to claim 1, wherein
    the polymer compound includes polyethylene.

6. The all-solid-state lithium ion secondary battery according to claim 1, wherein the weight ratio of the metal compound particles contained in the moisture-proof layer is 5%-30%.

7. The all-solid-state lithium ion secondary battery according to claim 1, wherein the weight ratio of the metal compound particles contained in the moisture-proof layer is 5%-25%.

8. The all-solid-state lithium ion secondary battery according to claim 1, wherein the weight ratio of the metal compound particles contained in the moisture-proof layer is 5%-15%.

9. The all-solid-state lithium ion secondary battery according to claim 1, wherein
    the metal compound particles include any one or more of metal oxide particles and metal nitride particles.

10. The all-solid-state lithium ion secondary battery according to claim 1, wherein
    the metal compound particles are metal oxide particles.

11. The all-solid-state lithium ion secondary battery according to claim 10, wherein
    the metal oxide particles include any one or more of Bi oxide particles, Al oxide particles, and Si oxide particles.

12. The all-solid-state lithium ion secondary battery according to claim 11, wherein
    the metal oxide particles include Bi oxide particles.

13. The all-solid-state lithium ion secondary battery according to claim 1, wherein
    the positive electrode layer, the negative electrode layer and the electrolyte layer disposed between the positive electrode layer and the negative electrode layer have a relative density of 80% or above.

* * * * *